US009715753B2

(12) United States Patent
Berry et al.

(10) Patent No.: US 9,715,753 B2
(45) Date of Patent: *Jul. 25, 2017

(54) PERSONALIZING MEDICAL CONDITIONS WITH AUGMENTED REALITY

(71) Applicant: ORCA HEALTH, INC., Sandy, UT (US)

(72) Inventors: Matthew M. Berry, Highland, UT (US); Daniel D. Lyman, Provo, UT (US); Gary L. Robinson, Sandy, UT (US)

(73) Assignee: ORCA HEALTH, INC., Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/016,116

(22) Filed: Feb. 4, 2016

(65) Prior Publication Data

US 2016/0232695 A1    Aug. 11, 2016

Related U.S. Application Data

(63) Continuation of application No. 13/747,595, filed on Jan. 23, 2013, now Pat. No. 9,256,962.

(51) Int. Cl.
*G09G 5/00* (2006.01)
*G06T 11/60* (2006.01)
(Continued)

(52) U.S. Cl.
CPC .......... *G06T 11/60* (2013.01); *G06K 9/00362* (2013.01); *G06T 11/00* (2013.01); *G06T 19/006* (2013.01); *G06K 2209/05* (2013.01)

(58) Field of Classification Search
CPC ... G06T 19/006; G06T 11/00; G06K 9/00362; G06K 2209/05
See application file for complete search history.

(56) References Cited

U.S. PATENT DOCUMENTS 2,780,002 A   2/1957  Shea et al.
4,221,060 A   9/1980  Moskowitz et al.
(Continued)

OTHER PUBLICATIONS

Luciano et al. "Haptics-based virtual reality periodontal training simulator", Feb. 13, 2009, Virtual Reality (2009) 13:69-85.*
(Continued)

*Primary Examiner* — Robert Craddock
(74) *Attorney, Agent, or Firm* — Workman Nydegger

(57) ABSTRACT

Augmented reality is used to simulate the impact of medical conditions on body parts and other objects within images taken of the objects. The simulations enable a user to see how a medical condition can affect the user by dynamically simulating the impact of the medical condition on captured images of body parts associated with the user in real-time. A user can select different medical conditions that are associated with different body parts. These objects are then identified within images containing the body parts using image recognition algorithms and/or user input. Thereafter, the images are modified so as to render the body parts as though the body parts were being impacted by the medical condition. The modifications are made by blending image data of the captured image with condition image data available to the processing system.

20 Claims, 9 Drawing Sheets

(51) Int. Cl.
*G06T 19/00* (2011.01)
*G06T 11/00* (2006.01)
*G06K 9/00* (2006.01)

(56) References Cited

U.S. PATENT DOCUMENTS

| | | | |
|---|---|---|---|
| 4,812,127 | A | 3/1989 | Hernandez |
| 5,085,236 | A | 2/1992 | Odneal et al. |
| 5,120,229 | A | 6/1992 | Moore et al. |
| 5,232,370 | A | 8/1993 | Hoye |
| 5,291,285 | A | 3/1994 | Yokoyama et al. |
| 5,477,241 | A | 12/1995 | Higgins et al. |
| 5,491,782 | A | 2/1996 | King et al. |
| 5,615,347 | A | 3/1997 | Davis et al. |
| 5,682,488 | A | 10/1997 | Gleason et al. |
| 5,688,118 | A | 11/1997 | Hayka et al. |
| 5,730,654 | A | 3/1998 | Brown |
| 5,748,907 | A | 5/1998 | Crane |
| 5,766,016 | A | 6/1998 | Sinclair et al. |
| 5,808,610 | A | 9/1998 | Benson et al. |
| 5,924,074 | A | 7/1999 | Evans |
| 5,944,531 | A | 8/1999 | Foley et al. |
| 5,986,657 | A | 11/1999 | Berteig et al. |
| 6,012,044 | A | 1/2000 | Maggioncalda et al. |
| 6,080,925 | A | 6/2000 | Rogers et al. |
| 6,152,731 | A | 11/2000 | Jordan et al. |
| 6,227,850 | B1 | 5/2001 | Christi et al. |
| 6,240,425 | B1 | 5/2001 | Naughton |
| 6,383,135 | B1 | 5/2002 | Chikovani et al. |
| 6,384,591 | B1 | 5/2002 | Estep et al. |
| 6,542,171 | B1 | 4/2003 | Satou et al. |
| 6,770,029 | B2 | 8/2004 | Iliff |
| 7,001,270 | B2 | 2/2006 | Taub |
| 7,107,547 | B2 | 9/2006 | Cule et al. |
| 7,117,450 | B1 | 10/2006 | Chaudhri |
| 7,117,453 | B2 | 10/2006 | Drucker et al. |
| 7,180,524 | B1 | 2/2007 | Axelrod |
| 7,212,998 | B1 | 5/2007 | Muller et al. |
| 7,222,308 | B2 | 5/2007 | Sauermann et al. |
| D567,806 | S | 4/2008 | Viduya et al. |
| 7,376,469 | B2 | 5/2008 | Eischeid et al. |
| 7,380,216 | B2 | 5/2008 | Feig et al. |
| 7,962,348 | B2 | 6/2011 | Dew et al. |
| 7,976,388 | B2 | 7/2011 | Park |
| 8,016,678 | B1 | 9/2011 | Hutter et al. |
| 8,062,089 | B2 | 11/2011 | Hardin et al. |
| 8,606,955 | B1 * | 12/2013 | Fernandes ......... G06F 17/30899 709/217 |
| 8,662,900 | B2 | 3/2014 | Bell et al. |
| 8,702,238 | B2 | 4/2014 | Berry et al. |
| 8,972,882 | B2 | 3/2015 | Berry |
| 2002/0082865 | A1 | 6/2002 | Bianco et al. |
| 2002/0118848 | A1 | 8/2002 | Karpenstein |
| 2003/0074234 | A1 | 4/2003 | Stasny |
| 2003/0208324 | A1 | 11/2003 | Bellwood et al. |
| 2004/0002873 | A1 | 1/2004 | Sachdeva |
| 2005/0104896 | A1 | 5/2005 | Kerr |
| 2005/0108645 | A1 | 5/2005 | Prentice et al. |
| 2005/0246647 | A1 | 11/2005 | Beam et al. |
| 2005/0279378 | A1 | 12/2005 | Lorch |
| 2006/0040246 | A1 | 2/2006 | Ding et al. |
| 2006/0190301 | A1 | 8/2006 | Sachdeva |
| 2006/0294142 | A1 | 12/2006 | Breedvelt-Schouten et al. |
| 2007/0143200 | A1 | 6/2007 | Muller et al. |
| 2007/0198296 | A1 | 8/2007 | Pellinat et al. |
| 2007/0236514 | A1 | 10/2007 | Agusanto et al. |
| 2007/0242069 | A1 | 10/2007 | Matsue |
| 2007/0270221 | A1 | 11/2007 | Park et al. |
| 2008/0027917 | A1 | 1/2008 | Makherjee |
| 2008/0136838 | A1 | 6/2008 | Goede et al. |
| 2008/0177602 | A1 | 7/2008 | Sopher et al. |
| 2008/0242953 | A1 | 10/2008 | Dew et al. |
| 2008/0243548 | A1 | 10/2008 | Cafer |
| 2009/0276487 | A1 | 11/2009 | Jensen et al. |
| 2010/0015589 | A1 | 1/2010 | Lehavi |
| 2010/0070297 | A1 | 3/2010 | Kharraz et al. |
| 2010/0070300 | A1 | 3/2010 | Anderson et al. |
| 2010/0257214 | A1 | 10/2010 | Bessette |
| 2010/0287001 | A1 | 11/2010 | Pearce et al. |
| 2010/0311028 | A1 | 12/2010 | Bell et al. |
| 2011/0145693 | A1 | 6/2011 | Mutic |
| 2011/0170752 | A1 | 7/2011 | Martin et al. |
| 2011/0264503 | A1 | 10/2011 | Lenahan et al. |
| 2012/0159391 | A1 | 6/2012 | Berry et al. |
| 2012/0206694 | A1 | 8/2012 | Raskar |
| 2012/0280988 | A1 | 11/2012 | Lampotang et al. |
| 2013/0071827 | A1 | 3/2013 | Berry et al. |
| 2013/0141697 | A1 | 6/2013 | Berry et al. |
| 2013/0142367 | A1 | 6/2013 | Berry et al. |
| 2013/0211284 | A1 | 8/2013 | Berry et al. |
| 2013/0315452 | A1 | 11/2013 | Berry et al. |
| 2014/0022283 | A1 | 1/2014 | Chan et al. |
| 2014/0122096 | A1 | 5/2014 | Berry et al. |
| 2014/0154655 | A1 | 6/2014 | Bell et al. |
| 2014/0156292 | A1 | 6/2014 | Kozicki et al. |
| 2014/0168606 | A1 | 6/2014 | Berry et al. |
| 2014/0173508 | A1 | 6/2014 | Berry et al. |
| 2014/0204118 | A1 | 7/2014 | Berry et al. |
| 2014/0215370 | A1 | 7/2014 | Berry et al. |
| 2014/0372955 | A1 | 12/2014 | Berry et al. |
| 2015/0046174 | A1 | 2/2015 | Mainwaring et al. |
| 2015/0379232 | A1 | 12/2015 | Mainwaring et al. |

OTHER PUBLICATIONS

Biggs, John Up Close with Biodigital's 3D Human Simulator [TCTV]TCTechCrunch, Apr. 25, 2012.
Mirracle, http://mirracle.de/, First Prototype of Magic Mirror, Jan. 3, 2011.
Pivi & Co, FatBooth, http://itunes.apple.com/us/app/fatbooth/id372268904?mt=8 Version 3.4 Accessed on Jan. 10, 2013.
Screenshot of brushing and flossing treatment manufactured by Scantlebury Orthodontics, Wayback Machine. <<http://web.archive.org>> Archived Apr. 29, 2012, 23 pages.
VueCare Media, Vue Simulator, About page accessed at: http://www.web.archive.org/seb/20110207031345/http://vuecaremedia.com/vuesim.html. Available as early as Feb. 7, 2011.
VueCare Media, Vue Simulator, Demo video accessed at: http://www.vuecaremedia.com/vuesim_demo.html copyright 2010.
VueCare Media: The Eye Channel Network press release accessed at: http://vuecaremedia.com/Final%20Press%20Release%2011-1-10.pdf, created Dec. 23, 2010.
Welcome to AR Lungs Website: http://www.arlungs.com/. Available as early as Jan. 7, 2013.
U.S. Appl. No. 13/237,530, Apr. 19, 2013, Office Action.
U.S. Appl. No. 13/237,530, Oct. 1, 2013, Office Action.
U.S. Appl. No. 13/838,865, Nov. 18, 2013, Office Action.
U.S. Appl. No. 13/093,272, Dec. 4, 2013, Office Action.
U.S. Appl. No. 13/237,530, Mar. 20, 2014, Office Action.
U.S. Appl. No. 13/838,865, May 15, 2014, Office Action.
U.S. Appl. No. 13/093,272, May 16, 2014, Notice of Allowance.
U.S. Appl. No. 13/477,794, May 20, 2014, Office Action.
U.S. Appl. No. 13/663,820, Jun. 6, 2014, Office Action.
U.S. Appl. No. 13/477,794, Aug. 29, 2014, Notice of Allowance.
U.S. Appl. No. 13/720,196, Sep. 12, 2014, Notice of Allowance.
U.S. Appl. No. 13/663,820, Oct. 2, 2014, Office Action.
U.S. Appl. No. 13/747,595, Oct. 8, 2014, Office Action.
U.S. Appl. No. 13/754,250, Oct. 24, 2014, Notice of Allowance.
U.S. Appl. No. 13/477,794, Oct. 24, 2014, Notice of Allowance.
U.S. Appl. No. 13/838,865, Dec. 17, 2014, Notice of Allowance.
U.S. Appl. No. 13/663,820, May 21, 2015, Office Action.
U.S. Appl. No. 13/747,595, Jun. 8, 2015, Notice of Allowance.
U.S. Appl. No. 13/747,595, Sep. 25, 2015, Notice of Allowance.
U.S. Appl. No. 14/251,400, May 5, 2016, Office Action.

* cited by examiner

PERSONALIZING MEDICAL CONDITIONS WITH AUGMENTED REALITY

CROSS-REFERENCE TO RELATED APPLICATIONS

This application is a continuation of U.S. patent application Ser. No. 13/747,595 filed on Jan. 23, 2013, entitled "PERSONALIZING MEDICAL CONDITIONS WITH AUGMENTED REALITY," which issued as U.S. Pat. No. 9,256,962 on Feb. 9, 2016, and which application is expressly incorporated herein by reference in its entirety.

BACKGROUND

1. The Field of the Invention

The present invention is generally related to computerized systems and methods for simulating medical conditions and, even more particularly, for personalizing the visual display of medical conditions with augmented reality.

2. The Relevant Technology

Existing computer interfaces enable users to access a variety of information, including information about medical conditions. For example, computer interfaces enable a user to submit a query for medical information and to thereafter view the results of their query displayed as text and images. Some systems are also capable of rendering information in rich formats, such as animations and interactive modeling.

A new type of interfacing, comprising augmented reality, enables an image of an environment to be captured from a camera and to be augmented or modified with simulated or supplemental imagery that makes it appear as though the environment actually contains the simulated or supplemental imagery. In some instances, the processes associated with augmented reality can be performed in real-time.

Despite these advances, however, there are currently no systems available for enabling a user to see how a particular medical condition will affect the user, in real-time, with augmented reality.

BRIEF SUMMARY OF THE INVENTION

The present invention extends to methods, systems, and computer program products for dynamically simulating medical conditions on captured images of anatomical objects in real-time to thereby personalize the medical conditions with augmented reality.

In some embodiments, a user interacts with interfaces of a computing system to identify a medical condition associated with at least one body part or other anatomical object. The system is also used to access and display an image of the corresponding anatomical object.

The anatomical object is also detected and recognized by the system with one or more image recognition algorithms such that the system can provide an indication that the anatomical object has been identified by highlighting the anatomical object in the displayed image and/or by modifying the interfacing that is rendered to the user.

In response to subsequent user input, the identified medical condition is rendered with or simulated on the image of the anatomical object to personalize the medical condition with augmented reality. In one embodiment, this is done by modifying the displayed image of the anatomical object with supplemental imagery associated with the identified medical condition. The displayed image of the anatomical object can be modified by overlaying, blending, replacing, or otherwise changing the captured imagery of the anatomical object with the supplemental imagery associated with the identified medical condition.

In some embodiments, the steps associated with rendering the medical condition are performed iteratively and/or as an animation in real-time, while imagery of the anatomical object continues to be accessed and displayed by the processing system(s).

Using the interfaces and systems of the invention, as described herein, it is possible to personalize the visual presentation of medical conditions and to further enhance learning associated with the medical conditions.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
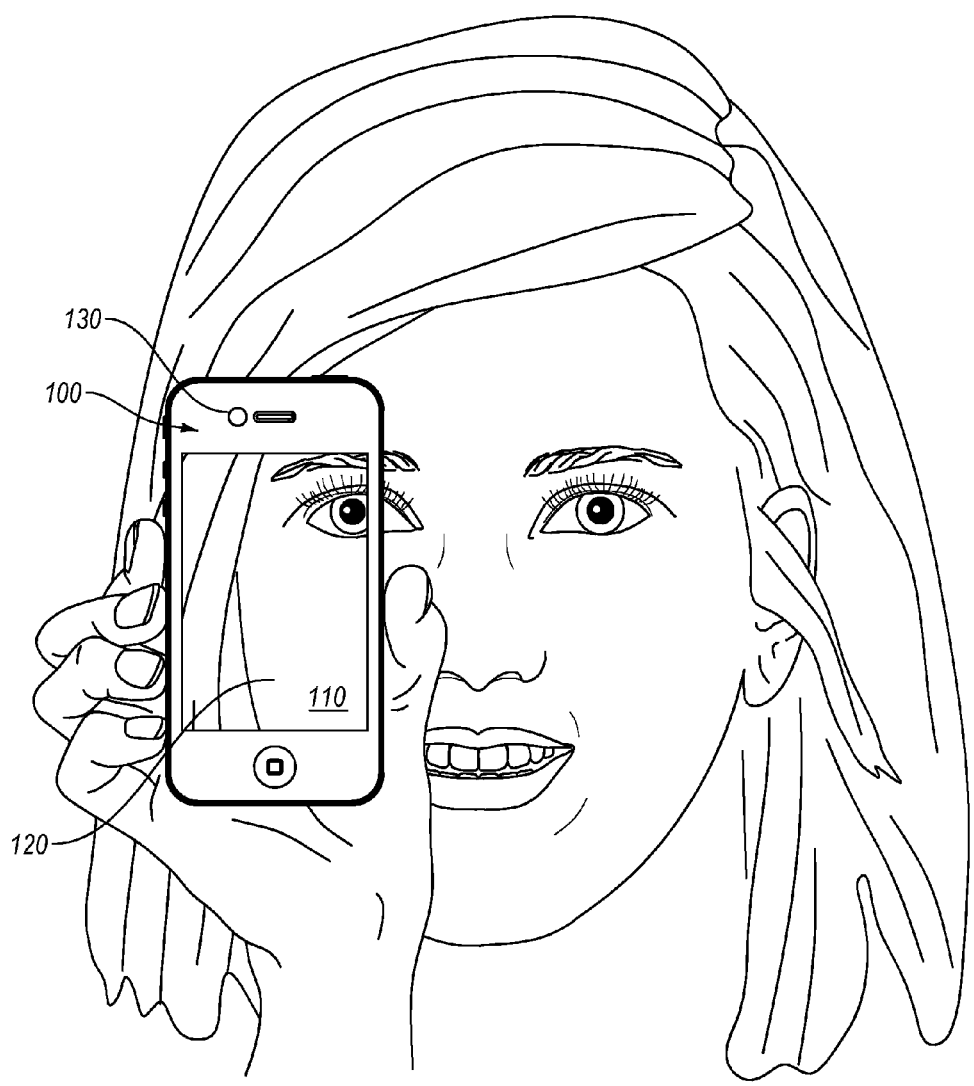
FIG. 1 illustrates a user holding a computing device that includes a display screen that is presently displaying an image of a portion of the user's face.

User interfaces are provided and utilized by the invention to personalize the manner in which medical conditions are rendered by electronic devices.

According to some embodiments, a user is able to see how a medical condition can affect the user by dynamically simulating the impact of the medical condition on captured images of body parts associated with the user in real-time.

Initially, a user interacts with a computing system to identify a medical condition or other context associated with an anatomical object (e.g., a body part). The system is then used to identify and detect the anatomical object within a captured image. The system provides an indication that the anatomical object has been detected by highlighting the anatomical object within the displayed image and/or by modifying the interfacing that the system renders to the user, such as, for example, by displaying a user interface control on the system display screen that is operable to initiate a rendering of the medical condition on the anatomical object.

In response to subsequent user input, such as the user selecting the interface control, the medical condition is simulated with the display of the anatomical object in the form of augmented reality. In one embodiment, this is done by overlaying, blending, replacing, or otherwise modifying the captured image of the anatomical object with supplemental imagery associated with the identified medical condition.

In some embodiments, the rendering of the medical condition is performed iteratively and/or as an animation, in real-time, while imagery of the anatomical object continues to be captured and displayed by the system as a stream of images.

Using the interfaces and systems of the invention, as described herein, it is possible to visually render the impact of a medical condition on a user in a personalized and intuitive manner.

It is noted that the term 'medical condition,' as used herein, can include negative medical conditions (e.g., degenerative conditions associated with unhealthy tissues and the presence of diseases or other harmful agents/objects), as well as positive medical conditions (e.g., treatments or other conditions that are associated with beneficial agents/objects). The medical conditions can also correspond to discrete stages of treatment, degeneration, passage of time, personalized medical records, diagnosis, and/or other medical information.

The term 'medical condition' is sometimes referred to herein as a 'medical context.' While the term 'medical condition' or 'medical context' can apply, in singular form, to only a single medical condition, it will be appreciated that the term 'medical condition' or 'medical context' can also apply to and include a plurality of different medical conditions that are related, but which are capable of being categorized independently.

The medical conditions or contexts described herein are associated with different anatomical structures by correlation tables and other data structures. These anatomical structures can include any body parts (e.g., eyes, nose, mouth, hair, teeth, gums, tongue, fingers, fingernails, hands, toes, feet, organs, bones, or any other body parts) or any combinations of body parts.

The terms 'computing system,' 'system,' 'computing device,' and 'device,' which are used interchangeably herein, all refer to computing systems that include physical computing hardware, such as a physical computing processor, a camera, a display screen, a storage device (e.g., computer memory and/or disk storage), and/or other computer hardware as described in more detail with reference to FIG. 9. In many embodiments, the computing systems are mobile devices (e.g., phones, tablets, notebook computers, portable gaming device, etc.) that are utilized to interact with the user interfaces of the invention. In other embodiments, the computing systems comprise stationary devices (e.g., desktop computers, gaming consoles, televisions, servers, kiosks, etc.) or a combination of stationary and mobile devices.

Preferably, although not necessarily, the computing systems have multi-touch screens that are operable to receive and process touch input and to display relevant output, although other input and output devices can also be used.

Personalizing Medical Conditions with Augmented Reality

FIG. 1 illustrates an a user holding a computing device 100 that is displaying an image 110 on a display screen 120. The image 110 is being captured in real-time, in response to the device 100 operating in an image capture mode (e.g., camera mode). The camera capturing the image 110 is a back-facing camera that is not presently visible. The back facing camera is similar to the front-facing camera 130, which is presently illustrated as a lens. Other camera hardware that is operable to capture the image 110 is housed within the device 100.

In some embodiments, the device 100 is put into a camera mode automatically in response to a user selecting a medical context (e.g., a medical condition) from a menu interface (not presently shown). It will be appreciated that different types of user interface menus can be utilized to enable a user to select a medical context or condition. Various non-limiting examples of such interface menus are shown and/or described in the following documents, which documents are all incorporated herein by reference in their entireties: U.S. patent application Ser. No. 13/093,272, filed Apr. 25, 2011; U.S. patent application Ser. No. 13/167,610, filed Jun. 23, 2011; U.S. patent application Ser. No. 13/167,600, filed Jun. 23, 2011; U.S. patent application Ser. No. 13/237,530, filed Sept. 20, 2011; U.S. patent application Ser. No. 13/477,794, filed May 22, 2012; U.S. patent application Ser. No. 13/663,820, filed Oct. 30, 2012; and U.S. patent application Ser. No. 13/720,196, filed Dec. 19, 2012.

In some embodiments, the device is manually put into a camera mode (before or after the medical context is identified) in response to a user selecting a camera mode button (not presently shown), which can be a physical button on the device or a virtual OS (operating system) interface control button associated with the device.

While in the camera mode, the systems of the invention utilize image recognition algorithms to detect one or more anatomical objects displayed within the images received by the device that are associated with the identified medical context. Image recognition algorithms that rely on spatial relationships, light spectrum analysis, light contrast analysis, and other distinguishing features or identifiable markers detected in an image are well-known to those of skill in the art. Known image recognition algorithms are currently used, for example, to identify faces and eyes.

The present invention utilizes data structures, such as tables and indexes that correlate anatomical objects with the image recognition data (e.g., spatial dimensions, color and light analysis and/or other distinguishing image features) as well as metadata that can be associated with recorded images. Then, when an image is captured or otherwise received and analyzed with the image recognition algorithms for the presence of the distinguishing image features and/or metadata, it is possible to use the correlation tables and other data structures to identify the anatomical objects that are associated with the detected image recognition data in the stored tables and data structures.

While the systems of the invention can be configured to identify any combination and quantity of anatomical features, it is preferable that the device will specifically search for and detect/identify the anatomical objects that are specifically associated with a particular medical context, based on relationships specified in the stored tables and data structures.

By way of example, in one embodiment, the medical condition conjunctivitis is associated with optical structures in the data structures, such that when the user identifies the medical condition conjunctivitis, the system will specifically search for, and in some instances only search for, anatomical objects associated with conjunctivitis, such as an eye and possibly tissue surrounding the eye (e.g., eyelids).

By way of another example, the data structures can link the condition of gingival recession (receding gums) with an anatomical object comprising the mouth (in the broadest context), and/or one or more oral components, such as teeth, gums, dental roots, and/or other oral tissues. Each of these related anatomical objects are further associated with the corresponding image recognition data in the same data structure or a different data structure. In this manner, when a user selects a condition associated with receding gums, the inventive systems will specifically search for and identify the anatomical objects (mouth, teeth, gums, and so forth) that have been associated with gingivitis in the stored correlation tables. The system will also search the same or different data structure(s) for any corresponding image recognition data that can be used by the image recognition algorithms to identify the presence of the corresponding anatomical object(s) in the image data captured by or otherwise received by the systems of the invention.

With regard to the foregoing, it is noted that it is possible to have different medical conditions associated with the same anatomical objects in the data structures. Similarly, a single medical condition/context can actually be associated with a plurality of discrete medical conditions. For instance, a condition or context of dental disease can be associated with receding gums, gingivitis, periodontitis, as well as other conditions that are each associated with combinations of the same anatomical objects by the correlation tables and data structures.

While many of the foregoing descriptions specifically relate to the identification of anatomical objects exclusively with the use of image recognition algorithms, it will be appreciated that the invention also extends to embodiments in which user input, such as touch input detected at the display screen while an anatomical object is displayed, to independently select or cooperatively (with the image recognition algorithms) facilitate the identification of the anatomical object.

It is also noted that the identification or detection of the anatomical objects within an image can be performed exclusively or partially by the device and/or another system that is in communication with the device and that receives and processes the image data from the device.

Figure 2:
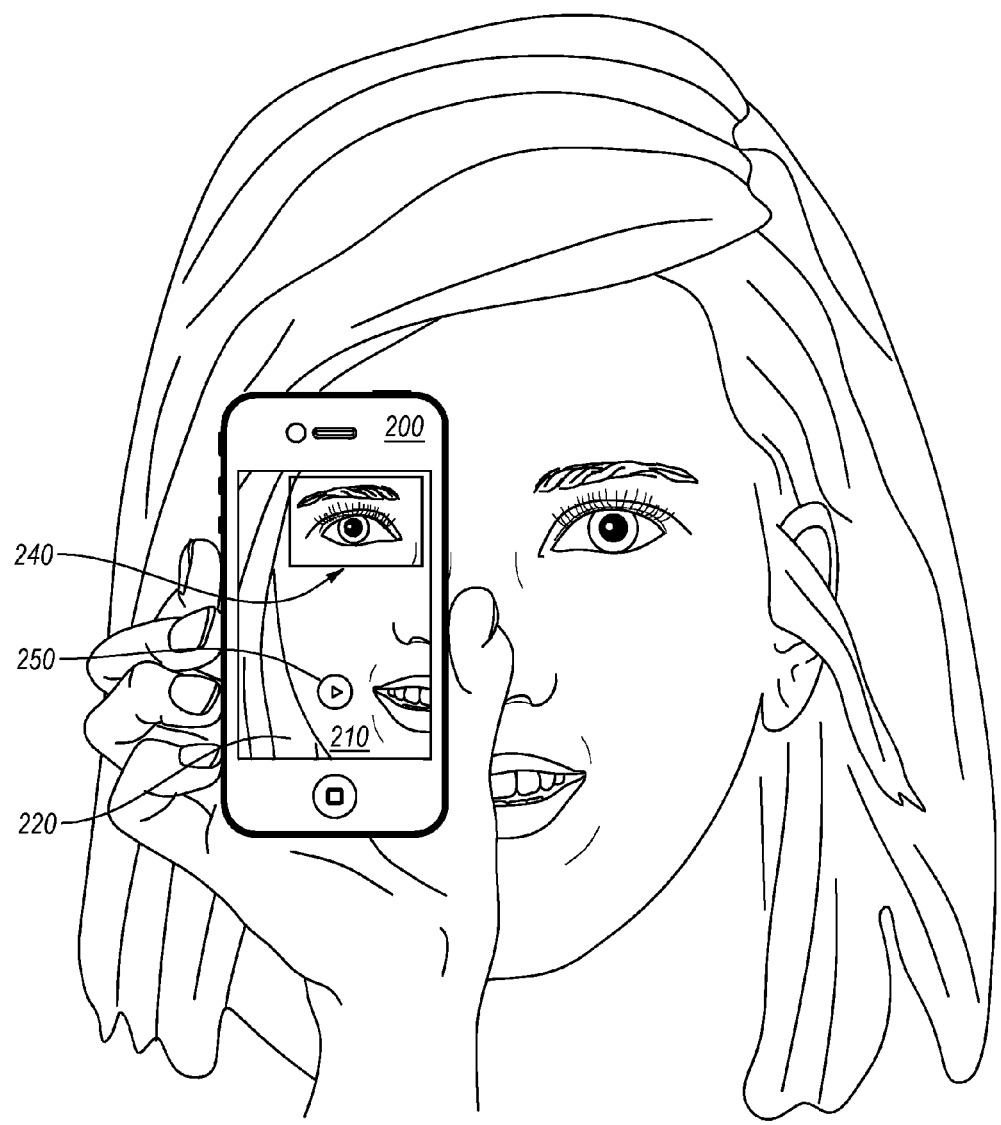
FIG. 2 illustrates an embodiment similar to FIG. 1, wherein one of the user's eyes is fully displayed on the display screen and wherein that eye has been highlighted.

Attention is now directed to FIG. 2, which illustrates an embodiment in which a user has already identified a medical context, such as conjunctivitis, from one or more user interface menus (not shown) and in which the device is operating in a camera mode automatically in response to the user selecting the medical context or in response to the user selecting an augmented reality button (not presently shown) that is displayed on the device in response to the user selecting the medical condition from the user interface menus.

As shown, the device 200 is displaying an image 210 that is being captured by a back facing camera (not shown). The image 210 is displayed on a display screen 220 along with highlighting, comprising a frame 240, that is displayed around the image of the user's eye.

According to some embodiments, the highlighting of the object (e.g., the eye) is performed automatically by the device 200 in camera mode, in response to the device 200 analyzing the captured image data for the distinguishing features that have been associated with the identified medical context by the correlation tables and, thereafter, upon detecting the presence of the anatomical object having the distinguishing features within the captured image that is now displayed.

The highlighting of an anatomical object that has been detected/identified/selected can be performed by framing the object, as shown. In other embodiments, not presently shown, the highlighting of the object is performed by changing a color of the object (e.g., by shading or other color changes), by changing a size of the object (e.g., by zooming in or enlarging the object), by outlining one or more components of the object, by annotating the object with supplemental markers or text, and/or by any other highlighting technique.

According to some embodiments, the device highlights the anatomical object substantially as soon as it becomes completely visible within the captured image data that is displayed on the display screen, as shown in FIG. 2. This is contrasted with the illustration of FIG. 1, wherein the eye is only partially displayed and is not, therefore, highlighted. It other embodiments, the anatomical object is highlighted as soon as it becomes identified, even if it is only partially visible within the display screen. For instance, the portion of the eye that is illustrated in FIG. 1 can be highlighted in this embodiment as soon as it becomes identified using the image recognition algorithms described above.

In other embodiments, the device refrains from highlighting the identified anatomical object, even when the anatomical object is associated with the identified medical condition.

A user can tilt, rotate, move, or zoom their device and/or device camera until a suitable image is captured that includes an anatomical object that is determined to be associated with the identified medical context. In some embodiments, the user can also switch between different cameras of the device (e.g., front facing, back facing and other cameras) in order to best capture the desired imagery containing the anatomical object(s) associated with the identified medical condition.

In some embodiments, the detection of the anatomical object associated with a medical context further triggers the display of an augmented reality control, such as the virtual play control 250 shown in FIG. 2, with or without the aforementioned highlighting.

The augmented reality control is operative, when selected, to initiate the rendering of the medical condition as a simulation that is used to modify the displayed imagery of the detected anatomical object via augmented reality processing.

Figure 3:
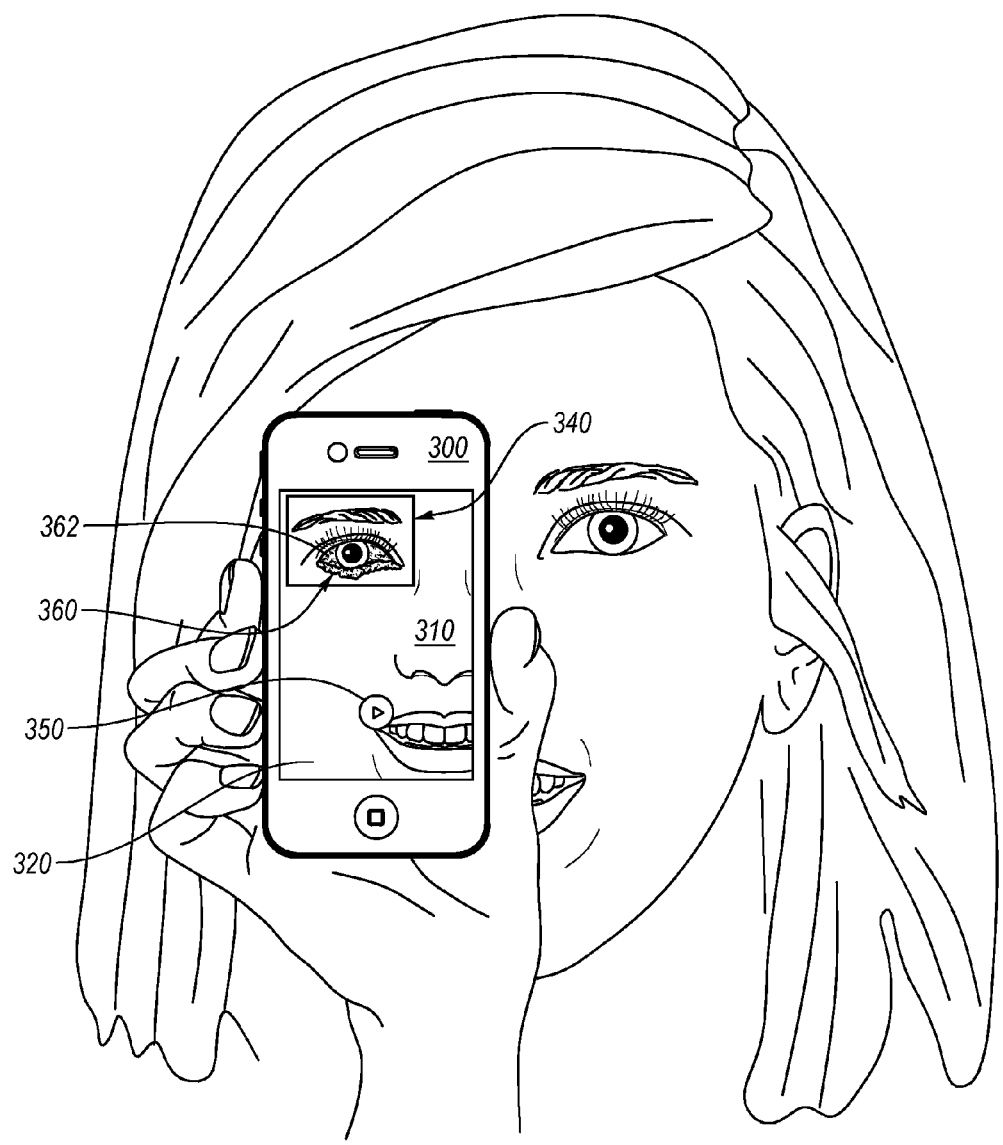
FIG. 3 illustrates an embodiment similar to FIG. 2, wherein the display of the highlighted eye has been modified to reflect a medical condition associated with the eye.

FIG. 3, for instance, reflects an embodiment similar to FIGS. 1 and 2, wherein the illustrated device 300 is used to render an image 310 on a display screen 320, wherein a medical context comprising conjunctivitis has been identified in response to user input, and wherein a corresponding anatomical object (e.g., an eye) has been detected and highlighted by a display frame 340 within the displayed image 310.

As further shown, an augmented reality control 350 is also displayed, which is operable to initiate the augmented reality simulation of the medical condition on the displayed image 310. As illustrated, this control 350 already been selected by touch input rendered at the display screen 320. This input has initiated the rendering of the medical condition (conjunctivitis) on the user's eye tissues as augmented reality within the displayed image 310. For instance, as shown, the eye is currently displayed with mucopurulent discharge 360 and an inflamed or otherwise agitated conjunctiva 362. This simulation of the medical condition is rendered on the displayed image 310 by modifying portions of the captured image that are associated with the identified anatomical object (e.g., the eye).

The rendering of the condition, via augmented reality processing, can be performed with any known image rendering techniques, including blending, masking, overlaying, replacing, coloring, or otherwise modifying portions of the captured image data, such as the portions of the image data that are associated with the anatomical object.

The captured image data is preferably modified with condition image data that is stored or remotely accessed by the system and that is correlated with the anatomical objects that are identified within the captured images. For instance, the condition image data correlated with conjunctivitis can include the displayed imagery of the mucopurulent discharge 360 and inflamed conjuncitiva tissue 362.

It will be appreciated that the augmented reality processing performed by the systems of the invention also includes accessing, positioning, aligning, and configuring the size, shape, and coloring of stored condition image data in such a way that the condition image data will be properly positioned, aligned, sized, and colored with the anatomical object to enhance the realism of the simulation of the medical condition with the anatomical object in the displayed image. Any known techniques can be used for positioning, aligning, sizing, and coloring the stored condition image data, including but not limited to, known techniques for mapping, scaling, positioning, rotating and other processing of image data. The amount and type of positioning, aligning, sizing and coloring applied to the condition image data will be directly based on the analysis performed on the captured image data and detected anatomical structure(s). In some embodiments, the positioning, aligning, sizing, and coloring applied to the condition image data is also based on a selected/identified severity of the condition to be rendered with the anatomical structure.

In some embodiments, the device 300 performs the image processing associated with the augmented reality (e.g., the augmented reality processing). In other embodiments, the device 300 sends the image data to another system that performs a portion or all of the augmented reality processing and which sends modified image data and/or instructions to the device 300 which are operable to render the condition as augmented reality on the displayed anatomical object.

The simulating of the medical condition can consist of performing of the augmented reality a single time, for a static image that is rendered by the device 300. Alternatively, the simulating of the medical condition is performed iteratively, as an animation, in real-time and on-the-fly as new image data continues to be captured/accessed and rendered by the device 300. When animated, the rendering of the condition, is preferably performed by modifying each of a plurality of display frames that are displayed by the device to reflect the impact of the medical condition on the corresponding anatomical object in the display, and such that the anatomical object continues to be displayed with the condition even when movement of the device causes the anatomical object to be displayed within a different portion of the display screen 320. This is illustrated, for example, as the position/rotation of the device changes from FIGS. 2-3, the highlighting frame (240, 340) moves with the movement of the eye within the displayed image. Similarly, the mucopurulent discharge 360 and inflamed conjuncitiva tissue 362 also move with the eye within the displayed image 310 as the device is rotated, tilted or otherwise moved. This embodiment is also beneficial for enhancing the realism of the simulated condition when the user tilts, rotates or otherwise moves their body (and the corresponding anatomical object), such that the rendering of the simulated condition is modified in size, shape, color, and other configurations to match the movements and changes to the user's body elements where the condition is simulated within the displayed imagery.

According to some embodiments, the augmented reality simulation presents only a single stage or severity of the medical condition by making substantially the same or similar condition modifications to the image of the anatomical object within each display frame of the image data. In other embodiments, the augmented reality includes presenting the condition as a dynamic condition which changes over time. For instance, in one embodiment, the conjunctivitis shown in FIG. 3 represents a relatively severe state of conjunctivitis, which is shown only after first showing the eye affected with one or more less severe states of conjunctivitis, wherein the displayed image smoothly transitions between the different stages of the condition over time. In this regard, the medical condition is displayed as a life-cycle animation by applying different modifications to the same portions of the displayed anatomical object within different sequential display frames of the displayed image data over time.

While the modification of the image data can occur in substantially real-time, as the image data is captured and rendered on-the-fly, it should also be appreciated that the modifications of the image data can also occur, in some embodiments, on a delayed basis. For instance, recorded video and other image data can be modified at a substantially later time than it was recorded (e.g., a minute later, several minutes later, or hours, days, weeks months or years later). Likewise, the modified image data can be rendered at the same time the modifications to the image data occurs, or at a substantially later time than when the modification to the image data occurs (e.g., a minute later, several minutes later, or hours, days, weeks months or years later).

Terminating the simulation of the medical condition can occur in direct in response to user input. For instance, once the augmented reality is initiated, the augmented reality control 350 can be changed into a stop button or a pause button (not presently shown), which is operable (when selected) to stop the augmented reality processing. A separate stop or pause button can also be displayed and used to perform similar functionality.

Terminating the simulation of the medical condition can also occur in response to a timer control (e.g., predetermined passage of time) and/or upon the completion of a computer process (e.g, an animation life-cycle).

Alternatively, moving the device so that the anatomical object is no longer displayed within the display screen 320 can also trigger the termination of the augmented reality processing.

Figure 4:
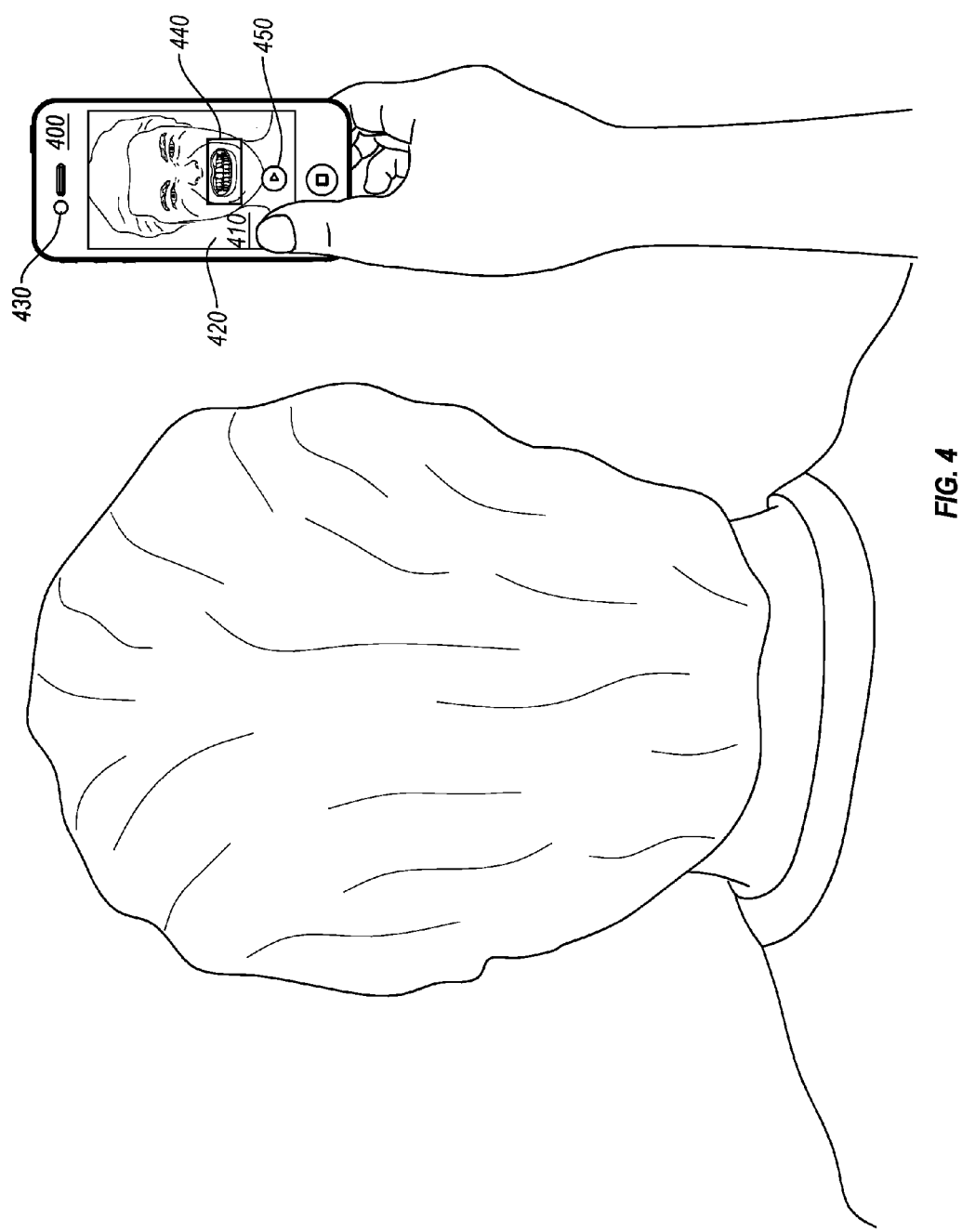
FIG. 4 illustrates a back perspective view of a user holding a computing device with a camera and a display screen displaying an image of the user being captured by the camera, wherein the user's mouth has been highlighted.

FIG. 4 illustrates a back perspective view of a user holding a computing device 400 with a camera 430 and a display screen 420 that is displaying an image 410 of the user. The image 410 is being captured by the camera 430 in response to the device 400 being placed in an image capture mode following the user's selection of a condition from a user interface menu (not shown) and/or in response to the user selecting an augmented reality control link from a user interface (not shown).

In the present embodiment, the user has selected a gum disease condition (e.g., receding gums). Accordingly, the device has highlighted the user's mouth with a displayed highlighting frame 440. In other embodiments, only the gums are highlighted with outlining or another form of highlighting. In yet other embodiments, the mouth and gums are not highlighted at all, even when identified.

Once the anatomical objects associated with the selected condition are detected within the image the device 400 displays an augmented reality control 450 for initiating the simulation of the selected condition. The display of the augmented reality control 450 and the highlighting frame 440 (when present) can also operate as an indicator that the anatomical object(s) associated with the selected condition have been identified and that the device is ready to render the augmented reality simulation of the medical condition. Once the augmented reality control 450 is selected, the simulation of the selected medical condition is initiated, as described above.

Figure 5:
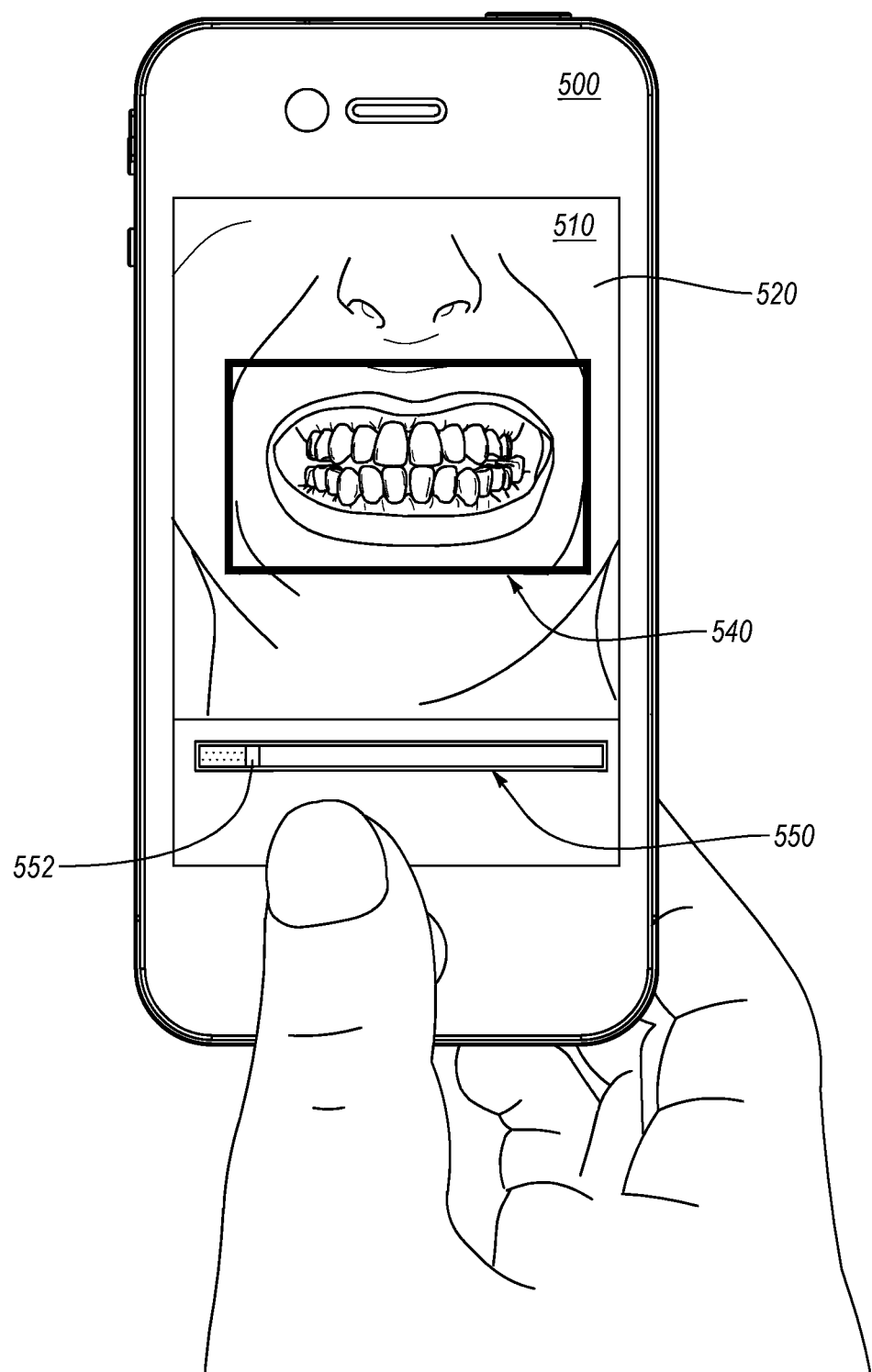
FIG. 5 illustrates another view of the computing device of FIG. 4, wherein the image of the user's mouth is zoomed in on within the displayed image on the display screen.
Figure 6:
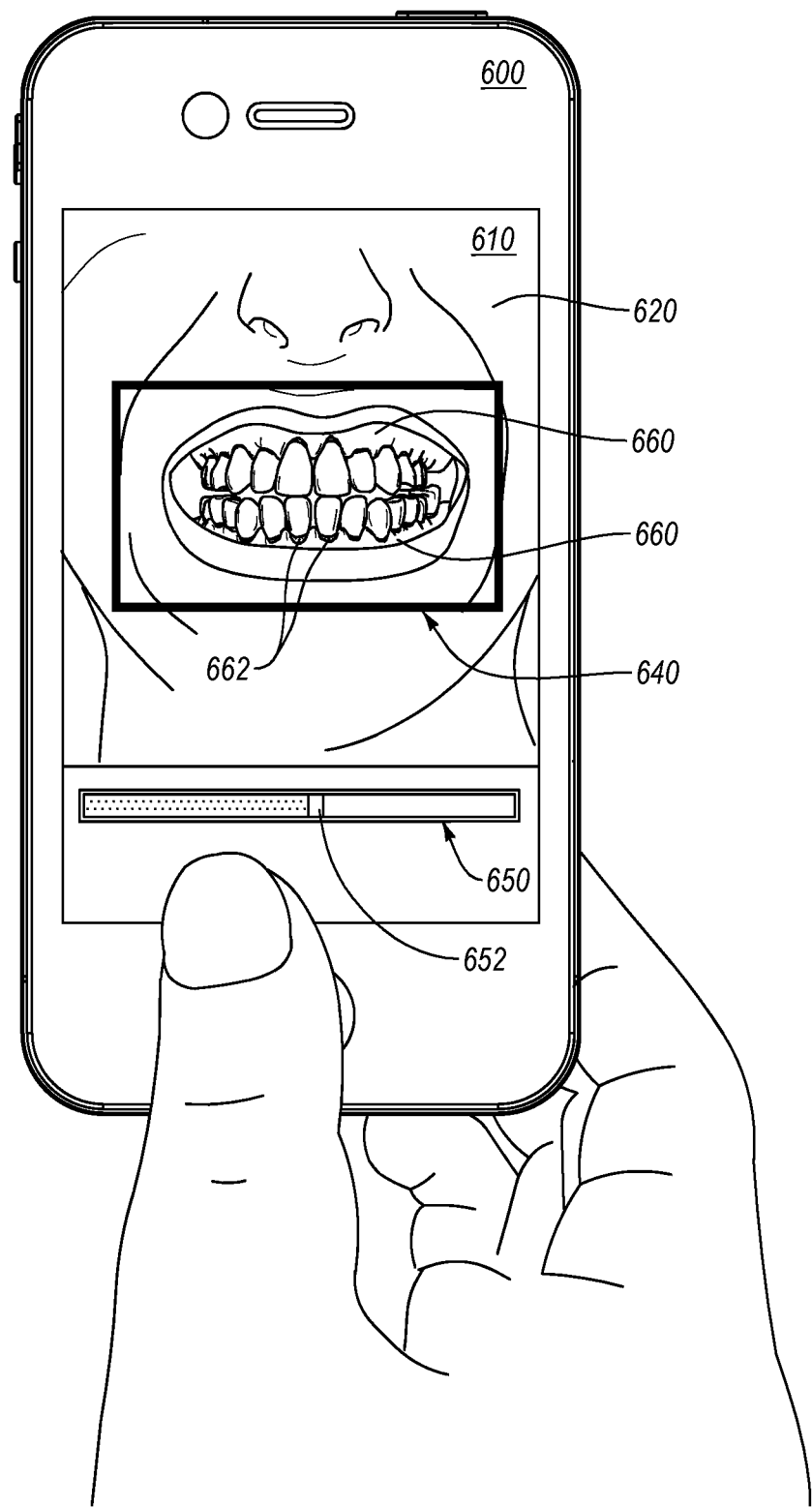
FIG. 6 illustrates an additional view of the computing device, as shown in FIG. 4, wherein the user's mouth is displayed with augmented reality modifications in such a way as to reflect a medical condition associated with the mouth and wherein a play bar reflects a relative progression or severity associated with the medical condition.

FIGS. 5-6 illustrate different periods of time after the augmented reality control 450 has been selected and different corresponding states of the augmented reality simulation corresponding to different stages or severities of the medical condition. In these embodiments, the image is also zoomed in around the detected anatomical object (e.g., the mouth). This zooming can be performed automatically by the device, in response to the user input selecting the augmented reality control 450 or in response to detecting the anatomical object. In other embodiments, the device does not zoom in on the image. Instead, the enlarged image results from the user repositioning the device (e.g., moving the device camera closer to the user's face and mouth).

As illustrated, the device 500 of FIG. 5 includes a display 520 that is displaying an image 510 of the user's mouth with a highlighting frame 540 around the mouth. The image 510 is also displayed with a play bar 550 that includes an indicator 552 that reflects a relative progression of the selected medical condition (e.g., receding gums). In some embodiments, the indicator 552 is a passive indicator. In other embodiments, the indicator 552 is an active control that is operable, when selected and moved by user input, to adjust the relative progression or severity of the condition that is being displayed.

FIG. 6 illustrates a device 600 that is similar to the device 500 of FIG. 5. For instance, the device 600 includes an image 610 of the user's mouth with a highlighting frame 640 around the user's mouth which resulted from a user selecting the medical condition associated with the mouth (e.g., gum disease) and in response to the device detecting the presence of the mouth within the image that is being displayed on the display screen 620. The image 610 is also displayed with a play bar 650 that has an indicator 652 reflecting the relative progression of an animation associated with the medical condition.

In the current embodiment, the augmented reality applied to the image 610 includes simulating receding gums by modifying the presentation of the displayed gums 660 on the image of the user's mouth. As reflected, the indicator 652 on the play bar 650 is about halfway between the start and end of the play bar 650, indicating the severity of the condition is about a medium level of severity and/or that the simulation of the medical condition is about halfway through its animation cycle.

For the current state of the condition, the simulation includes displaying the user's gums 660 in the live camera display as though the gums 660 have receded to such a degree that they have exposed the roots 662 of some of the teeth and such that the gums have become somewhat inflamed (which can include a change in size and color). This simulation occurs by replacing or modifying portions of the gums from the captured image data with new condition image data that is appropriately positioned, aligned, sized, shaped, and colored to match the corresponding condition and stage of the condition, as described above. The new condition image data used to modify the image is changed or replaced with different new condition image data as the state of the condition changes and/or as the device captures different images in which the user's mouth is displayed in a different position.

The referenced animation cycle can progress automatically from start to finish, once started. Alternatively, the cycle can be controlled in response to a user manually manipulating the relative placement of the indicator 652 on the play bar 650.

With regard to the foregoing embodiment, it will be appreciated that the animation cycle can comprise a partial cycle, starting with a first state or severity of the condition and ending with a different state or severity, as suggested with regard to FIG. 6. Alternatively, the animation cycle can also comprise a complete cycle that progresses from a first state to one or more subsequent states and then back to the first state by rendering the one or more subsequent states in reverse order.

Figure 7:
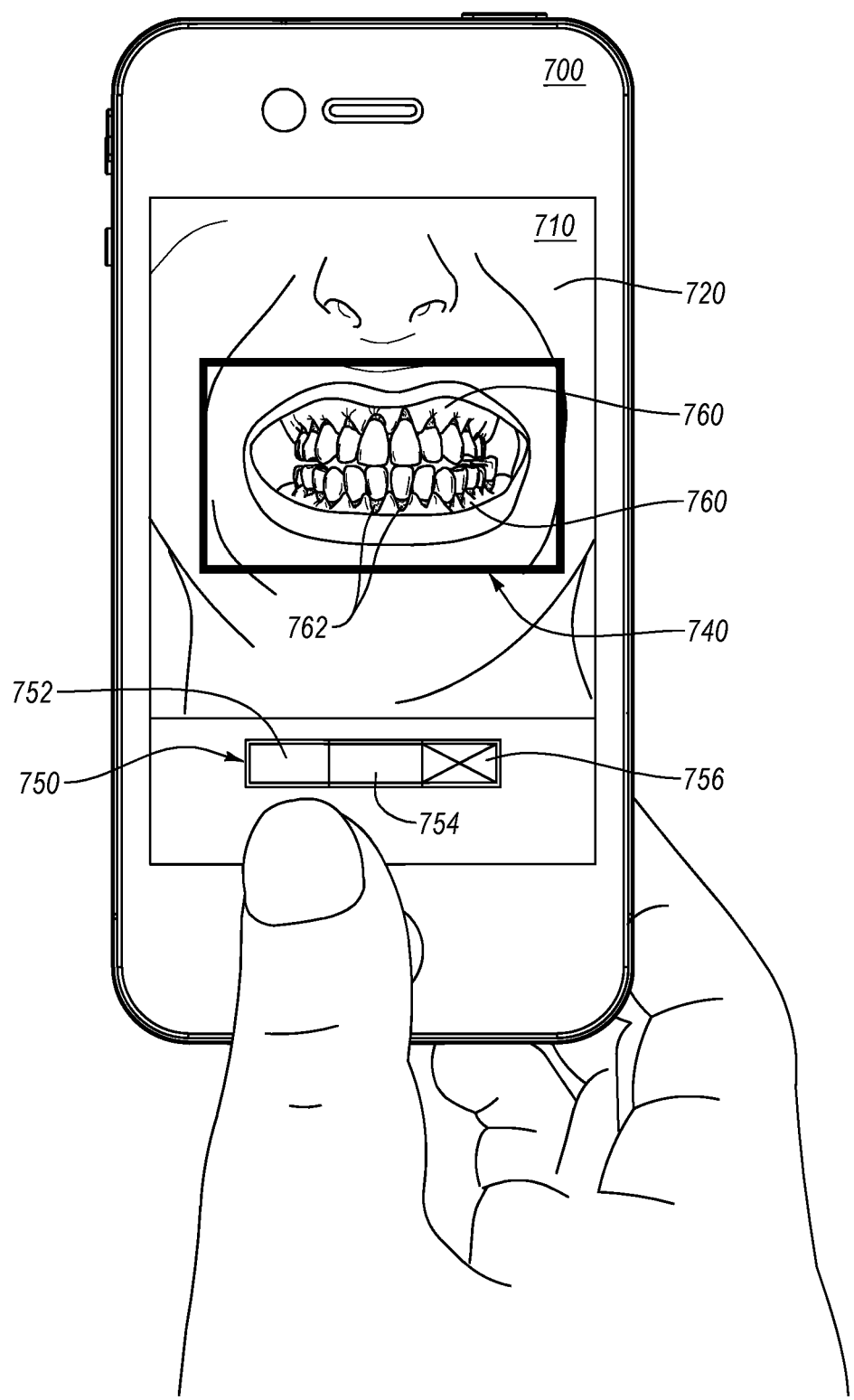
FIG. 7 illustrates another view of a computing device, as shown in FIGS. 5-6, wherein the display of the user's mouth is further modified to reflect a different severity or stage of the medical condition and wherein the play bar is replaced by an interface control for selectably controlling the simulated display of different stages of the medical condition via augmented reality.

FIG. 7 illustrates another embodiment for controlling the simulation of the selected medical condition. In FIG. 7, a device 700 is used to display an image 710 of a mouth on a display screen 720, as generally described above. Likewise, the mouth is highlighted by a frame 740 surrounding the mouth. However, instead of providing a play bar, the present embodiment includes an augmented reality control 750 that has a plurality of selectable controls (752, 754, 756) which, when selected, advance the condition to a corresponding state of severity. For instance, selection of control 752 will result in the user's mouth being be displayed as rendered in FIG. 5, selection of control 754 will result in the user's mouth being displayed as rendered in FIG. 6, and whereas selection of control 756 (as selected) results in the mouth being displayed as rendered in FIG. 7, with severely exposed roots 762 and severely inflamed gums 760.

Figure 8:
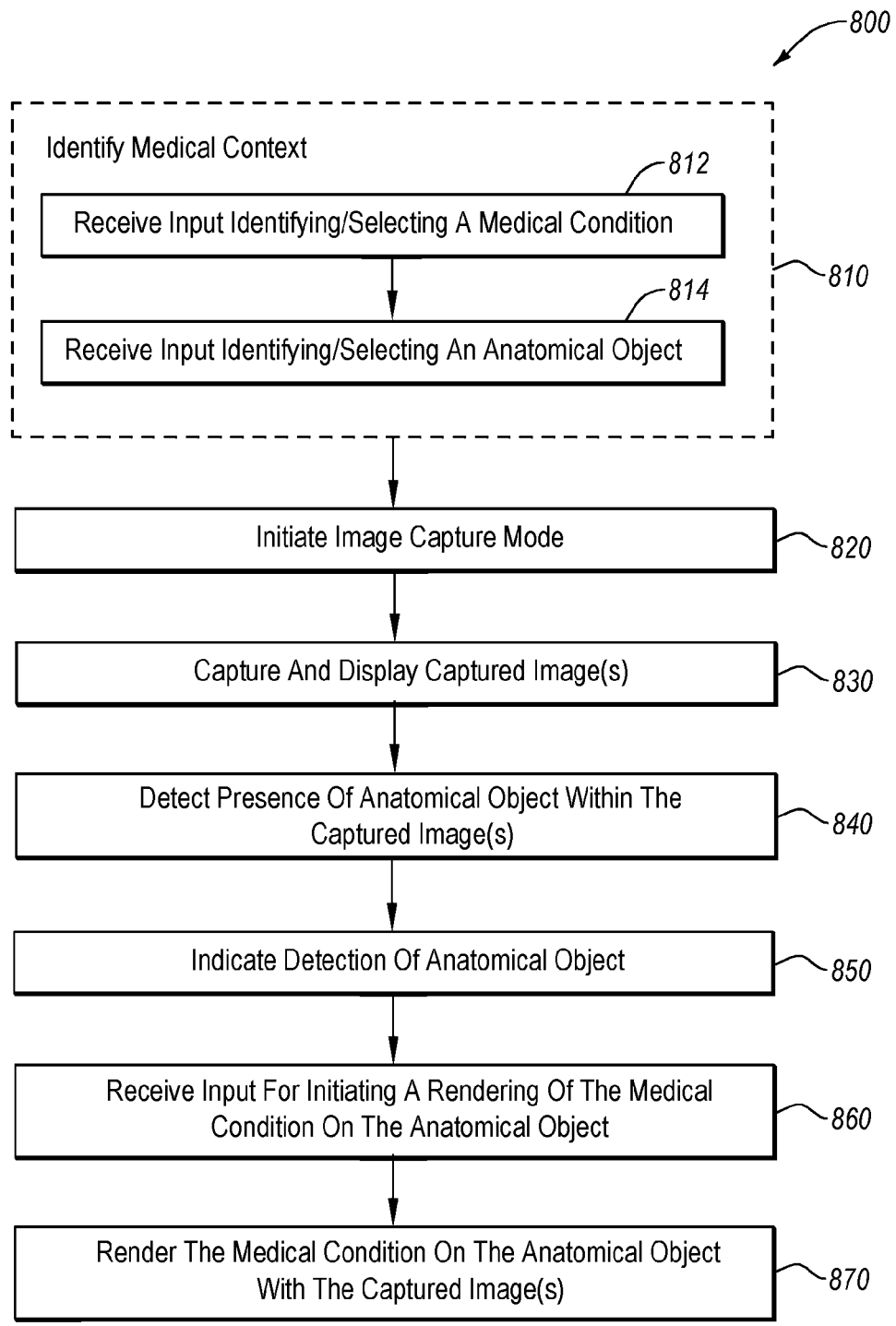
FIG. 8 illustrates a flow diagram of various acts that are associated with the methods of the invention.

Attention will now be directed to FIG. 8 which illustrates a flow diagram 800 of various acts that are associated with methods of the invention, which correspond to the functionality described above.

As shown, the methods of the invention can include the act of or step for identifying a medical context 810. This aspect of the invention can also include a plurality of related acts, such as receiving user input for identifying or selecting a medical condition 812 and receiving input for identifying and selecting an anatomical object associated with the medical condition 814.

The act of receiving input for identifying and selecting the medical condition 812 can occur when a user selects an interface menu object (with touch input or other input) corresponding to the medical condition. In other embodiments, the user can provide textual information or other typed input that relates to the medical condition. In some embodiments, the medical condition can also be identified and selected in response to input received from a third party, such as a doctor or a system that is capable of performing a diagnosis of a condition. In any embodiments, the input is preferably received at the device that is utilized to display the images of the anatomical objects with the simulations of the identified medical conditions.

As noted above, the medical conditions that are selected or identified are associated with one or more corresponding anatomical objects. These anatomical objects are also associated with distinguishing visual properties or characteristics that can be identified in images that include the anatomical objects.

The methods of the invention also include the initiation of a camera mode or an image capture mode 820. This can occur, in some embodiments, automatically in response to the device identifying the medical condition/context and the associated anatomical objects that relate to the identified medical condition.

In camera mode or image capture mode, the device captures or otherwise accesses an image 830 containing the associated anatomical object(s). Preferably, the images containing the anatomical objects are captured by the same device that displays the images and at a time that is contemporaneous with the time that the images are being captured, such as in a live video display format. In other words, the image is captured by a camera attached to the device and the image that is captured includes an anatomical object that is visible to the camera at the time the image is captured. However, the images can also be captured by another device and provided to the display device. While the images are preferably displayed in real-time, as they are captured, they can also be displayed at a much later time. Accordingly, the act of initiating the image capture mode 820 of the device, to capture the images can also be viewed more broadly as initiating the accessing of an image by the device. Similarly, the acts of capturing and displaying the captured image(s) can be broadly viewed, in some embodiments, as accessing and displaying an image containing the anatomical object(s) associated with the identified medical condition.

The methods of the invention also include an act of detecting the presence of anatomical object(s) within the captured/accessed image(s) 840. This act can be performed with the use of user input that identifies the anatomical object(s) and/or in response to the analysis performed with the image recognition algorithms of the captured image and with the use of the data structures that correlate anatomical objects to image characteristics, as described above in reference to FIGS. 1-7.

Once an anatomical object is detected within the captured image data, an indication of that detection can be made (850) by highlighting the anatomical object and/or by modifying the interfacing displayed with the image containing the anatomical object, as described above in reference to FIGS. 1-7.

In some embodiments, the detection of the anatomical object(s) 840 and the indicating of the detection of the anatomical object(s) 850 includes distinguishing the identified anatomical object from one or more other anatomical objects that are also present in the captured image(s) which can be associated with the same medical condition or a different medical condition. For example, the captured image may include the presence of two eyes and a mouth. However, if the condition is associated with the mouth, the systems of the invention will refrain from highlighting or detecting the presence of the eyes by only searching for features matching the visual characteristics of the mouth. Alternatively, the system may identify, but simply refrain from highlighting the eyes. In another example, the systems may also detect and/or highlight only one of the two eyes when the condition is associated with the eyes.

The medical condition associated with the anatomical object is also rendered with the captured/access image (870) in response to user input that initiates the rendering/simulation (860), as described above with respect to FIGS. 1-7. In some embodiments, the input initiating the rendering comprises a user selecting a condition severity and/or the manipulation of a play button or an augmented reality control, as described above. This input can also be received after the simulation of the condition with the anatomical object has already begun. For instance, the user can provide input that adjusts the severity of a condition after the condition is already being rendered with the anatomical object.

Preferably, although not necessarily, the simulation of the medical condition is rendered as occurring on a surface element (e.g., skin, or surface tissue) of the anatomical object that is visible to the naked eye and the camera, while that surface element is simultaneously visible to the camera and at least partially displayed on the display screen. It is also preferable, although not necessary, for the simulation of the medical condition to occur at substantially the same time that the image is captured and processed for the augmented reality, such as, for example, within less than a few seconds of the image capture and even more preferably in less than a single second of the image capture. However, the simulation can also occur many seconds, minutes, hours, days and even weeks after the image capture, as described above.

While the acts described above can be performed in the illustrated sequence, it will be appreciated that these acts can also be performed in a different sequence as well. For instance, by way of example, the identification of the medical context/condition (810, 812) can occur subsequent to the acts of displaying the captured image (830) and even the detecting the presence of the anatomical objects (840). In fact, the detected presence of the anatomical objects (840), in some embodiments, can automatically trigger the identification/selection of the medical condition (812) which is ultimately determined to be correlated to the identified medical condition.

Accordingly, while various specific examples have been provided herein, it will be appreciated that the invention extends to any combination of the functionality, interfaces, systems and methods described herein. Furthermore, while many of the embodiments have been described with regard to degenerative or negative medical conditions, it will also be appreciated that the identified/simulated conditions can also correspond to treatments that simulate healthy tissues in the place of captured image data that reflects unhealthy tissues, for example.

It will also be appreciated that the anatomical objects described above can include anatomical objects comprising human body parts as well as body parts of animals and plant parts. The referenced anatomical objects can also include published reproductions of human, animal or plant parts, such as images displayed in a magazine or other publication, which are capable of being detected and displayed by the systems of the invention.

Computing Environment(s)

Embodiments of the present invention may comprise or utilize special purpose or general-purpose computing devices that include computer hardware, such as, for example, one or more processors and system memory, as discussed in greater detail below. Embodiments within the scope of the present invention also include physical and other computer-readable and recordable type media for storing computer-executable instructions and/or data structures. Such computer-readable recordable media can be any available media that can be accessed by a general purpose or special purpose computer system. Computer-readable media that store computer-executable instructions according to the invention are recordable-type storage media or other physical computer storage media (devices) that are distinguished from merely transitory carrier waves.

Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, DVD-ROM, HD-DVD, BLU-RAY or other optical disk storage, magnetic disk storage or other magnetic storage devices, or any other medium which can be used to store desired program code means in the form of computer-executable instructions or data structures and which can be accessed by a general purpose or special purpose computer and which are recorded on one or more recordable type medium (device).

A "network" is defined as one or more data links or communication channels that enable the transport of electronic data between computer systems and/or modules and/or other electronic devices. When information is transferred or provided over a network or another communications connection or channel (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) or vice versa. For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at one or more processor, cause one or more general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the invention may be practiced in network computing environments with many types of computer system configurations, including personal computers, desktop computers, laptop/notebook computers, message processors, hand-held devices, multi-processor systems, microprocessor-based or programmable consumer electronics, network PCs, minicomputers, mainframe computers, tablets, mobile telephones, PDAs, pagers, routers, switches, and the like. The invention may also be practiced in distributed and cloud system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 9:
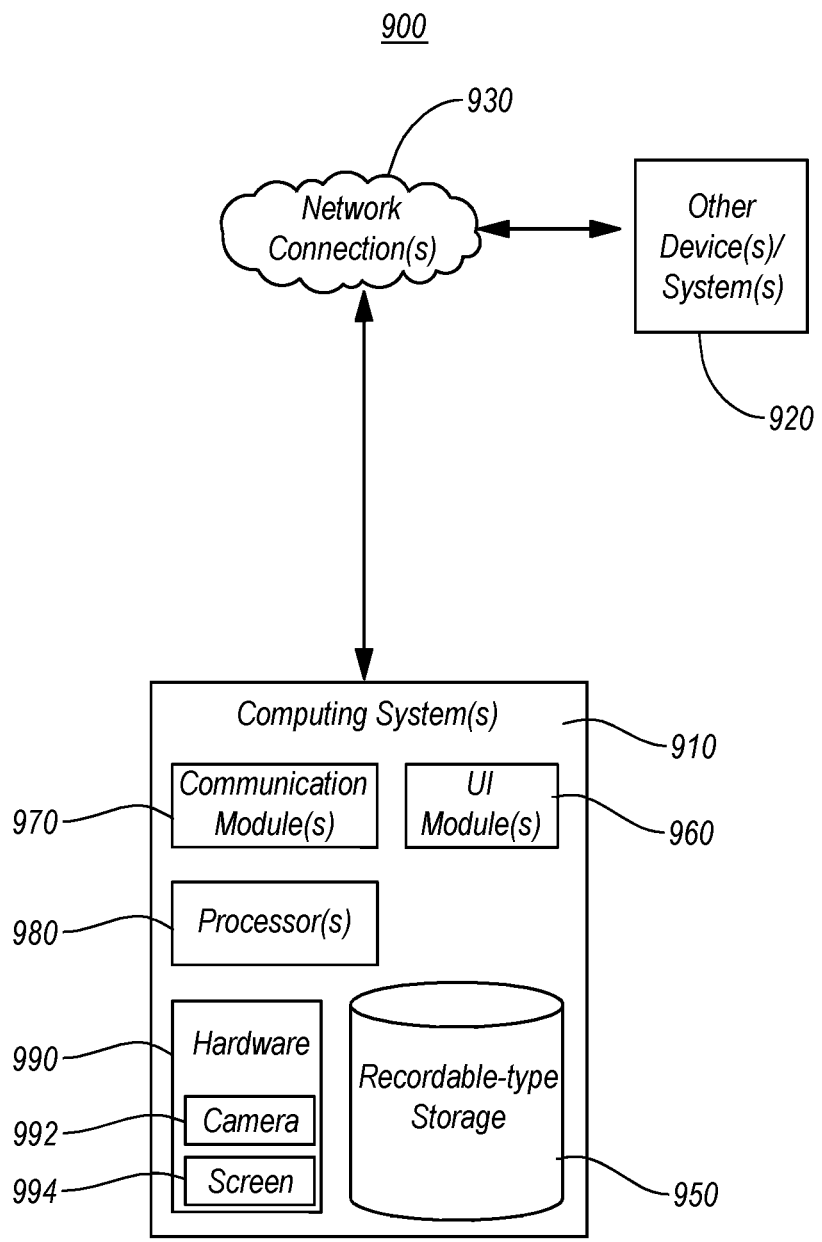
FIG. 9 illustrates one example of a computing environment that can be utilized to implement aspects of the invention.

FIG. 9 illustrates an exemplary computing environment 900 that can be used to present the user interfaces of the invention, to facilitate user interaction with anatomical structures rendered on the user interfaces, and to demonstrably reflect the impact of various conditions and treatments on those anatomical structures.

As shown, the computing environment 900 includes one or more computing systems 910 in communication with one or more other devices and/or systems 920 through one or more network connections 930. The other systems and devices can be output and input devices, servers, proxies, or any other systems or devices. The network connections 930 can be wired and/or wireless connections and can include any combination of Local Area Network ("LAN") connections, Wide Area Network ("WAN") connections, including the Internet and one or more proxy servers.

As illustrated, the computing system 910 is configured with a storage 950 that has stored computer-executable instructions for implementing the methods of the invention. The storage 950 also stores medical record data (e.g., annotations, medical diagnosis data, condition correlation tables and data structures, image data associated with various anatomical objects and conditions, image rendering instructions for performing the augmented reality processing and image blending, and so forth), as well as image recognition algorithms that are operable to identify/detect anatomical objects from the image data that is captured by the device camera 992, based on the stored medical record data and/or other known metrics and distinguishing visual characteristics associated with the anatomical objects, as described above with reference to FIGS. 1-7.

The storage 950 also store modules, such as the user interface (UI) module 960 and the communication module 970, which each comprise computer-executable instructions and data structures for implementing aspects of the invention.

The communication module 970, for instance, includes computer-executable instructions that, when executed by one or more processors 980 are operable to facilitate wireless and/or wired communications through the network connections 930 to access or transmit data associated with the interfaces described herein, including the interfaces themselves. The communication modules are also configured to encrypt and decrypt data and to perform authentication of user and system credentials.

The interface module 960 includes computer-executable instructions that, when executed by the one or more processors 980 are operable to generate and/or present the user interfaces described above. Interface module 960 also provides computer-executable instructions that, when executed, are operable to detect and process user input and to perform the functionality described above, such as, but not limited to modifying the display of the anatomical objects by replacing/augmenting and/or blending the display data with supplemental image data associated with different medical conditions.

The data stored at storage 950 can also include any of the interfaces and data described in reference to the following patent applications, each of which is incorporated herein by reference its entirety, and such that the present invention can incorporate any combination of functionality described in this document as well as any of the functionality described in the following documents: U.S. patent application Ser. No. 13/093,272, filed Apr. 25, 2011; U.S. patent application Ser. No. 13/167,610, filed Jun. 23, 2011; U.S. patent application Ser. No. 13/167,600, filed Jun. 23, 2011; U.S. patent application Ser. No. 13/237,530, filed Sept. 20, 2011; U.S. patent application Ser. No. 13/477,794, filed May 22, 2012; U.S. patent application Ser. No. 13/663,820, filed Oct. 30, 2012; and U.S. patent application Ser. No. 13/720,196, filed Dec. 19, 2012.

The storage 950 can comprise, but is not limited to, non-volatile disk storage and volatile memory. It will also be appreciated that the storage 950 can be distributed among a plurality of different devices or systems, including the other illustrated system(s)/device(s) 920, and does not necessarily need to be constrained to a single physical device. In some embodiments, however, the storage 950 is limited to local storage of the computing system 910.

In some embodiments, the computing system 910 comprises a wireless cell phone, a tablet computer, a notebook computer, a PDA, and/or any other type of smart device having a display screen 994, camera 992, speakers and other hardware 990 for rendering image data, audio data, and/or textual data to a user via the interfaces (960, 970) of the system (910), for example. In some embodiments, the hardware 990 of the system 910 includes a display screen 994 that is a multi-touch screen capable of receiving touch input.

The computing systems of the invention can include mobile devices (e.g., phones, tablets, notebook computers, portable gaming device, etc.) and stationary device (e.g., desktop computers, gaming consoles, televisions, servers, kiosks, etc.).

It will be appreciated that the system hardware 990 can include any output device (e.g., display screen, speakers, printer, etc.), as well as any input device (keyboard, mouse, microphone, touchpad, etc.).

Each of the other connected systems/devices 920 also includes hardware, processor and storage components similar to those described above with respect to system 910.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A storage device having stored computer-executable instructions which, when executed by at least one computing processor, implement a method for dynamically modifying an image containing an anatomical object that is displayed on a display screen of a computing system that includes a camera that is used to capture the image that is displayed and modified according to the method, the method comprising:

using the camera of the computing system to capture the image containing the anatomical object;

using the computing system to automatically detect the presence of the anatomical object within the captured image, the anatomical object being associated with a medical condition;

displaying the captured image on a display screen associated with the computing system, the captured image being rendered in real-time with the automatically detected anatomical object; and an act of the computer system, in response to detecting user input manipulating a control for rendering a simulation at the computing system, rendering the simulation of the medical condition associated with the automatically detected anatomical object at the display screen, wherein the simulation dynamically reflects a simulated impact of the medical condition associated with the corresponding anatomical object by displaying a progressive stage of the medical condition from the capture image.

2. The storage device recited in claim 1, wherein the computing system is a mobile computing system, wherein the mobile computing system includes the camera used to capture the image containing the anatomical object, and wherein the mobile computing system also includes the display screen wherein the simulation is rendered.

3. The storage device recited in claim 1, wherein the method further includes receiving user input manipulating the control at the computing system subsequent to displaying the captured image and prior to rendering the simulation.

4. The storage device recited in claim 3, wherein the simulation is rendered in response to receiving user input selecting a play button.

5. The storage device recited in claim 1, wherein simulation of the medical condition consists of modifying a single display frame rendering the captured image as a static image.

6. The storage device recited in claim 1, wherein the simulation of the medical condition comprises the modifying of a plurality of sequential display frames used to render a plurality of the captured images on the display screen, including the captured image, as an animation.

7. The storage device recited in claim 6, wherein similar modifications are made to correspondingly related portions of the plurality of sequential display frames, the correspondingly related portions of the plurality of sequential display frames rendering similar image data associated with the anatomical object at different portions on the display screen while the anatomical object is moved relative to the camera.

8. The storage device recited in claim 6, wherein different modifications are made to correspondingly similar portions of the plurality of sequential display frames to reflect a dynamic change in the simulation of the medical condition, while the anatomical object remains in a same position relative to the camera such that the correspondingly similar portions of the plurality of sequential display frames rendering similar image data associated with the anatomical object.

9. The storage device recited in claim 1, wherein the medical condition is a degenerative or harmful condition, and wherein the simulation dynamically reflects the simulated impact of the medical condition over time by displaying different, progressive stages of the medical condition over time and transitioning between the different, progressive stages of the medical condition over time to show the progression of the medical condition over time.

10. The storage device recited in claim 9, wherein the medical condition is at least one of conjunctivitis, gingival recession, gingivitis, or periodontitis.

11. The storage device recited in claim 1, wherein the medical condition is a treatment or beneficial condition, and wherein the simulation dynamically reflects the simulated impact of the medical condition over time by displaying different, progressive stages of the medical condition over time and transitioning between the different, progressive stages of the medical condition over time to show the progression of the medical condition over time.

12. The storage device recited in claim 1, wherein the rendering of the simulation of the medical condition with the anatomical object includes blending image data of the captured image with stored condition image data associated with the identified condition.

13. The storage device recited in claim 1, wherein the indicator comprises a highlighting element that highlights the automatically detected anatomical object in the captured image.

14. The storage device recited in claim 1, wherein the method further includes receiving user input for identifying the medical condition.

15. The storage device recited in claim 1, wherein the simulated impact of the medical condition on the corresponding automatically detected anatomical object is based on a user selected severity of the medical condition.

16. The storage device recited in claim 1, wherein the medical condition is at least one of conjunctivitis, gingival recession, gingivitis, or periodontitis.

17. The storage device recited in claim 1, wherein the storage device further stores one or more data structures correlating the identified medical condition with the anatomical object and the anatomical object with image characteristics associated with the anatomical object.

18. The storage device recited in claim 1, wherein the anatomical object comprises at least one of an eye and a mouth.

19. A computer implemented method for dynamically modifying an image of an anatomical object that is displayed on a display screen of a computing system, the method comprising:
　obtaining an image containing an anatomical object;
　using the computing system to automatically detect the presence of the anatomical object within the captured image, the anatomical object being associated with a medical condition;
　displaying the captured image on a display screen associated with the computing system, the captured image being rendered with the automatically detected anatomical object and an indicator that the automatically detected anatomical object has been automatically detected; and
　an act of the computer system, in response to detecting user input manipulating a control for rendering a simulation at the computing system, rendering the simulation of the medical condition associated with the automatically detected anatomical object at the display screen, wherein the simulation dynamically reflects a simulated impact of the medical condition over time by displaying, with the simulation, different progressive stages of the medical condition over time and transitioning between the different progressive stages of the medical condition over time to show the progression of the medical condition over time.

20. A computing device comprising:
　at least one hardware processor;
　a display screen; and
　one or more storage media having stored computer-executable instructions which, when executed by the at least one hardware processor, implement a method for dynamically modifying an image of a body part that is displayed on a display screen associated with the computing device, the method comprising:
　obtaining an image containing an anatomical object comprising a body part;
　detecting the presence of the body part within the image, the anatomical object being associated with a medical condition;
　displaying the image on a display screen associated with the computing system, the image being rendered with the body part in a way that highlights the body part and in such a way as to indicate that the body part has been detected within the image; and
　rendering augmented reality on the display screen, the augmented reality comprising a dynamic simulation of the medical condition that modifies at least a portion of the captured image of the body part and that is rendered as an animation with a plurality of different display frames which reflects the simulated impact of the medical condition, over time, on the image of the body part.

* * * * *